US012619175B2

(12) United States Patent
Nakaue et al.

(10) Patent No.: US 12,619,175 B2
(45) Date of Patent: May 5, 2026

(54) IMAGE FORMING APPARATUS THAT CAN PERFORM A FIRST IMAGE QUALITY IMPROVEMENT MODE IN WHICH THE FREQUENCY OF AN ALTERNATING-CURRENT VOLTAGE IN A DEVELOPMENT VOLTAGE AND A PRIMARY TRANSFER CURRENT FLOWING BETWEEN AN IMAGE CARRYING MEMBER AND A PRIMARY TRANSFER MEMBER ARE SIMULTANEOUSLY CHANGED

(71) Applicant: KYOCERA Document Solutions Inc., Osaka (JP)

(72) Inventors: Takahisa Nakaue, Osaka (JP); Ryosuke Kimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 10 days.

(21) Appl. No.: 18/762,110

(22) Filed: Jul. 2, 2024

(65) Prior Publication Data

US 2025/0013172 A1 Jan. 9, 2025

(30) Foreign Application Priority Data

Jul. 5, 2023 (JP) ................................ 2023-110647
Sep. 1, 2023 (JP) ................................ 2023-142113

(51) Int. Cl.

*G03G 15/16* (2006.01)
*G03G 15/00* (2006.01)
*G03G 15/08* (2006.01)

(52) U.S. Cl.

CPC ..... *G03G 15/1605* (2013.01); *G03G 15/0887* (2013.01); *G03G 15/5037* (2013.01);

(Continued)

(58) Field of Classification Search

CPC .......... G03G 15/5041; G03G 15/5033; G03G 15/5054; G03G 15/065; G03G 15/1675

See application file for complete search history.

(56) References Cited

U.S. PATENT DOCUMENTS 7,054,568 B2 * 5/2006 Mizes ................ G03G 15/5041 399/60
7,236,711 B2 * 6/2007 Burry ................ G03G 15/1645 399/60

(Continued)

FOREIGN PATENT DOCUMENTS

JP H07191535 A * 7/1995
JP 2004069804 A * 3/2004

(Continued)

*Primary Examiner* — Arlene Heredia Ocasio
(74) *Attorney, Agent, or Firm* — Stein IP, LLC

(57) ABSTRACT

An image forming apparatus includes an image carrying member, a charging device, a charging voltage power supply, an exposure device, a development device, a development voltage power supply, an intermediate transfer member, a primary transfer member, a secondary transfer member, a transfer voltage power supply and a control unit. The development device includes a developer carrying member which carries a developer containing a toner. The development voltage power supply applies, to the developer carrying member, a development voltage in which an alternating-current voltage is superimposed on a direct-current voltage. The transfer voltage power supply applies a transfer voltage to the primary transfer member and the secondary transfer member. The control unit performs a first image quality improvement mode in which the frequency of the alternating-current voltage of the development voltage and a primary transfer current flowing between the image carrying member and the primary transfer member are simultaneously changed.

6 Claims, 7 Drawing Sheets

(52) U.S. Cl.
CPC .................. *G03G 15/5041* (2013.01); *G03G 2215/00042* (2013.01)

(56) References Cited

U.S. PATENT DOCUMENTS

| | | | | |
|---|---|---|---|---|
| 8,331,816 | B2 * | 12/2012 | Sheflin | G03G 15/5041 399/60 |
| 8,666,269 | B2 * | 3/2014 | Tanaka | G03G 21/203 399/44 |
| 10,585,381 | B1 * | 3/2020 | Takenaka | G03G 15/0907 |

FOREIGN PATENT DOCUMENTS

| | | | |
|---|---|---|---|
| JP | 2005-099260 | A | 4/2005 |
| JP | 2008292846 | A * | 12/2008 |

* cited by examiner

IMAGE FORMING APPARATUS THAT CAN PERFORM A FIRST IMAGE QUALITY IMPROVEMENT MODE IN WHICH THE FREQUENCY OF AN ALTERNATING-CURRENT VOLTAGE IN A DEVELOPMENT VOLTAGE AND A PRIMARY TRANSFER CURRENT FLOWING BETWEEN AN IMAGE CARRYING MEMBER AND A PRIMARY TRANSFER MEMBER ARE SIMULTANEOUSLY CHANGED

INCORPORATION BY REFERENCE

This application is based upon and claims the benefit of priority from the corresponding Japanese Patent Applications Nos. 2023-110647, filed on Jul. 5, 2023 and 2023-142113, filed on Sep. 1, 2023, the entire contents of which are incorporated herein by reference.

BACKGROUND

The present disclosure relates to image forming apparatuses, such as a copying machine, a printer, a facsimile and a multifunctional peripheral thereof, which include an image carrying member, and particularly relates to an image forming apparatus of an intermediate transfer system which transfers, on an intermediate transfer belt, a toner image formed on the image carrying member such as a photosensitive drum.

Conventionally, an image forming apparatus of an intermediate transfer system is known which includes a seamless intermediate transfer belt that is turned in a predetermined direction and a plurality of image formation units that are provided along the intermediate transfer belt, and in which toner images of individual colors are sequentially superimposed by the image formation units on the intermediate transfer belt to be primarily transferred thereon, and thereafter the toner images are secondarily transferred by a secondary transfer roller on a recording medium such as a sheet.

In the image forming apparatus of the intermediate transfer system, a primary transfer current flows into a photosensitive drum, and thus the surface potential of the photosensitive drum is changed. Specifically, the amount of primary transfer current flowing into a part (image part) where a toner is present is reduced, and thus the amount of primary transfer current flowing into a part (white part) where no toner is present is increased. In other words, the so-called drum ghost (historical development) is problematic in which the surface potential is changed depending on whether a toner is present to cause inconsistencies in density.

SUMMARY

An image forming apparatus according to a first aspect of the present disclosure includes an image carrying member, a charging device, a charging voltage power supply, an exposure device, a development device, a development voltage power supply, an intermediate transfer member, a primary transfer member, a secondary transfer member, a transfer voltage power supply and a control unit. In the image carrying member, a photosensitive layer is formed on a surface. The charging device charges the surface of the image carrying member. The exposure device exposes the surface of the image carrying member charged by the charging device to form an electrostatic latent image in which charging is attenuated. The development device includes a developer carrying member which carries a developer containing a toner, and supplies, to the image carrying member, the toner contained in the developer carried by the developer carrying member to develop the electrostatic latent image into a toner image. On the intermediate transfer member, the toner image formed on the image carrying member is sequentially primarily transferred. The primary transfer member is pressed against the image carrying member through the intermediate transfer member. The secondary transfer member secondarily transfers, on a recording medium, the toner image primarily transferred on the intermediate transfer member. The charging voltage power supply applies a charging voltage to the charging device. The development voltage power supply applies, to the developer carrying member, a development voltage in which an alternating-current voltage is superimposed on a direct-current voltage. The transfer voltage power supply applies, to the primary transfer member and the secondary transfer member, a transfer voltage of a polarity opposite to the toner image. The control unit controls the charging voltage power supply, the development voltage power supply and the transfer voltage power supply. The control unit performs a first image quality improvement mode in which the frequency of the alternating-current voltage of the development voltage and a primary transfer current flowing between the image carrying member and the primary transfer member are simultaneously changed.

DETAILED DESCRIPTION

Figure 1:
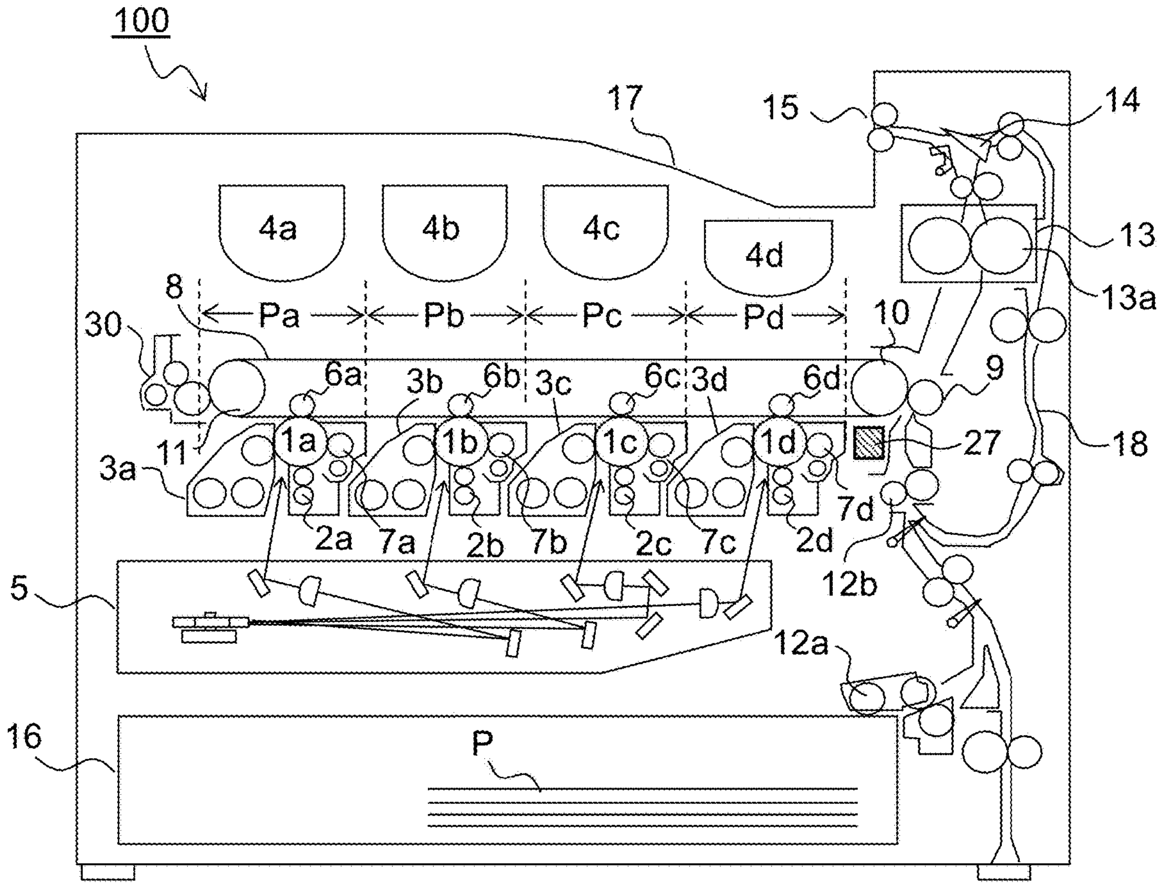
FIG. 1 is a schematic configuration view of a color printer according to an embodiment of the present disclosure.
Figure 2:
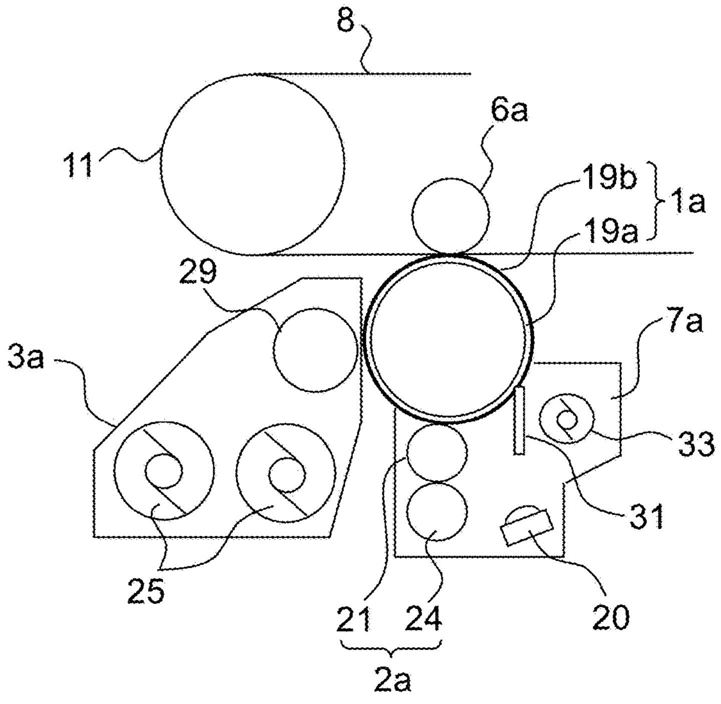
FIG. 2 is an enlarged view of an area around an image formation unit shown in FIG. 1.

Embodiments of the present disclosure will be described below with reference to drawings. FIG. 1 is a schematic cross-sectional view of a color printer 100 according to an embodiment of the present disclosure. FIG. 2 is an enlarged view of an area around an image formation unit Pa shown in FIG. 1. Since image formation units Pb to Pd basically have the same configuration, the description thereof is omitted.

In the main body of the color printer 100, the four image formation units Pa, Pb, Pc and Pd are sequentially provided from an upstream side (the left side in FIG. 1) in a conveyance direction. These image formation units Pa to Pd are provided according to images of four different colors (yellow, magenta, cyan and black), and the image formation units Pa to Pd each perform steps of charging, exposure, development and transfer to sequentially form images of yellow, magenta, cyan and black.

In these image formation units Pa to Pd, photosensitive drums 1*a*, 1*b*, 1*c* and 1*d* are respectively provided which carry visible images (toner images) of the individual colors. An intermediate transfer belt 8 which is rotated in a counterclockwise direction in FIG. 1 is further provided adjacent to the image formation units Pa to Pd. The intermediate transfer belt 8 is stretched over a drive roller 10 on a downstream side and a tension roller 11 on the upstream side, and on the upstream side of the image formation unit Pa in the direction of rotation of the intermediate transfer belt 8, a belt cleaning device 30 is arranged which is opposite the tension roller 11 through the intermediate transfer belt 8.

As shown in FIG. 2, around the photosensitive drum 1*a*, a charging device 2*a*, a development device 3*a*, a cleaning device 7*a* and a static eliminator 20 are arranged along the direction of rotation of the drum (in a clockwise direction in FIG. 2), and a primary transfer roller 6*a* is arranged through the intermediate transfer belt 8.

Each of the photosensitive drums 1*a* to 1*d* includes a conductive base member 19*a* and a photosensitive layer 19*b* which is formed on the surface of the conductive base member 19*a*. In the present embodiment, a single organic photosensitive layer is stacked as the photosensitive layer 19*b* on the surface of the cylindrical conductive base member 19*a* made of aluminum.

Each of the charging devices 2*a* to 2*d* includes: a charging roller 21 which is in contact with the corresponding one of the photosensitive drums 1*a* to 1*d* to apply a charging voltage (direct-current voltage+alternating-current voltage) to the surface of the drum; and a charging cleaning roller 24 for cleaning the charging roller 21.

Each of the development devices 3*a* to 3*d* is a development device of a two-component development system which includes two stirring conveyance screws 25 and a development roller 29, and predetermined amounts of two-component developers including the toners of the colors of yellow, magenta, cyan and black and a magnetic carrier are charged into the development devices 3*a* to 3*d*, respectively. A magnetic brush is formed on the surface of the development roller 29, and in a state where the development voltage of the same polarity (here, a positive polarity) as the toner is applied to the development roller 29, the magnetic brush is brought into contact with the surface of the photosensitive drum 1*a* to 1*d* adhere the toner and to form the toner image. When the ratios of the toners in the two-component developers charged into the development devices 3*a* to 3*d* drop below specified values due to the formation of the toner images, the toners are supplied from toner containers 4*a* to 4*d* to the development devices 3*a* to 3*d*.

Each of the cleaning devices 7*a* to 7*d* includes a cleaning blade 31 and a collection screw 33. The cleaning blade 31 removes the toner and the like left on the surface of the corresponding one of the photosensitive drums 1*a* to 1*d*. The collection screw 33 discharges the toner and the like removed by the cleaning blade 31 to the outside of the corresponding one of the cleaning devices 7*a* to 7*d*, and the toner and the like are collected in a waste toner collection container (not shown). The static eliminator 20 applies static elimination light to the surface of the corresponding one of the photosensitive drums 1*a* to 1*d* to eliminate residual charge.

When image data is input from a host device such as a personal computer, a main motor 40 (see FIG. 3) first starts the rotation of the photosensitive drums 1*a* to 1*d*. A belt drive motor 41 (see FIG. 3) starts the drive and rotation of the intermediate transfer belt 8. Then, the charging devices 2*a* to 2*d* uniformly charge the surfaces of the photosensitive drums 1*a* to 1*d* such that they have the same polarity (here, the positive polarity) as the toners. Then, an exposure device 5 applies light according to the image data to form, on the photosensitive drums 1*a* to 1*d*, electrostatic latent images in which charging is attenuated.

The predetermined amounts of two-component developers (hereinafter also simply referred to as the developers) including the toners of the colors of yellow, magenta, cyan and black are charged into the development devices 3*a* to 3*d* by the toner containers 4*a* to 4*d*, and the development devices 3*a* to 3*d* supply the toners included in the developers on the photosensitive drums 1*a* to 1*d*, with the result that the toners are electrostatically adhered thereto. In this way, the toner images corresponding to the electrostatic latent images formed by exposure from the exposure device 5 are formed.

Then, an electric field is applied by the primary transfer rollers 6*a* to 6*d* at a predetermined transfer voltage between the primary transfer rollers 6*a* to 6*d* and the photosensitive drums 1*a* to 1*d*, and thus the toner images of yellow, magenta, cyan and black on the photosensitive drums 1*a* to 1*d* are primarily transferred on the intermediate transfer belt 8. The toners and the like left on the surfaces of the photosensitive drums 1*a* to 1*d* after the primary transfer are removed by the cleaning devices 7*a* to 7*d*. The residual charge left on the surfaces of the photosensitive drums 1*a* to 1*d* after the primary transfer is eliminated by the static eliminator 20.

A transfer sheet P on which the toner images are transferred is stored in a sheet cassette 16 arranged in a lower part of the color printer 100, and the transfer sheet P is conveyed with predetermined timing via a paper feed roller 12*a* and a registration roller pair 12*b* into a nip portion (secondary transfer nip portion) between the secondary transfer roller 9 provided adjacent to the intermediate transfer belt 8 and the intermediate transfer belt 8. The transfer sheet P on which the toner images have been secondarily transferred is conveyed to a fixing unit 13.

The transfer sheet P which has been conveyed to the fixing unit 13 is heated and pressurized by the fixing roller pair 13*a*, the toner images are fixed on the surface of the transfer sheet P and thus a predetermined full color image is formed. The transfer sheet P on which the predetermined full color image has been formed is ejected by an ejection roller pair 15 to an ejection tray 17 without being processed (or after being distributed by a branch portion 14 to a reverse conveyance path 18 such that images are formed on both surfaces).

An image density sensor 27 is arranged in a position opposite the intermediate transfer belt 8 on the downstream side of the image formation unit Pd. As the image density sensor 27, an optical sensor is generally used which includes a light emission element formed with an LED and the like and a light reception element formed with a photodiode and the like. In a case where the amount of toner adhered on the intermediate transfer belt 8 is measured, when measurement light is applied from the light emission element to patch images (reference images) formed on the intermediate transfer belt 8, the measurement light enters the light reception element as light which is reflected off the toner and light which is reflected off the surface of the belt.

The light reflected from the toner and the surface of the belt includes specularly reflected light and diffusely reflected light. The specularly reflected light and the diffusely reflected light are separated by a polarization separation prism, and thereafter they each enter separate light reception elements. The light reception elements photoelectrically convert the received specularly reflected light and diffusely reflected light to output the resulting output signals to a control unit 90 (see FIG. 3).

Then, the image density (toner amount) and the image position of the patch image are detected from changes in the characteristics of the output signals of the specularly reflected light and the diffusely reflected light, the characteristic value of the development voltage, the exposure start position and timing of the exposure device 5 and the like are adjusted by comparison with a predetermined reference density and a predetermined reference position and thus the density correction and color shift correction (calibration) are performed for each of the colors.

Figure 3:
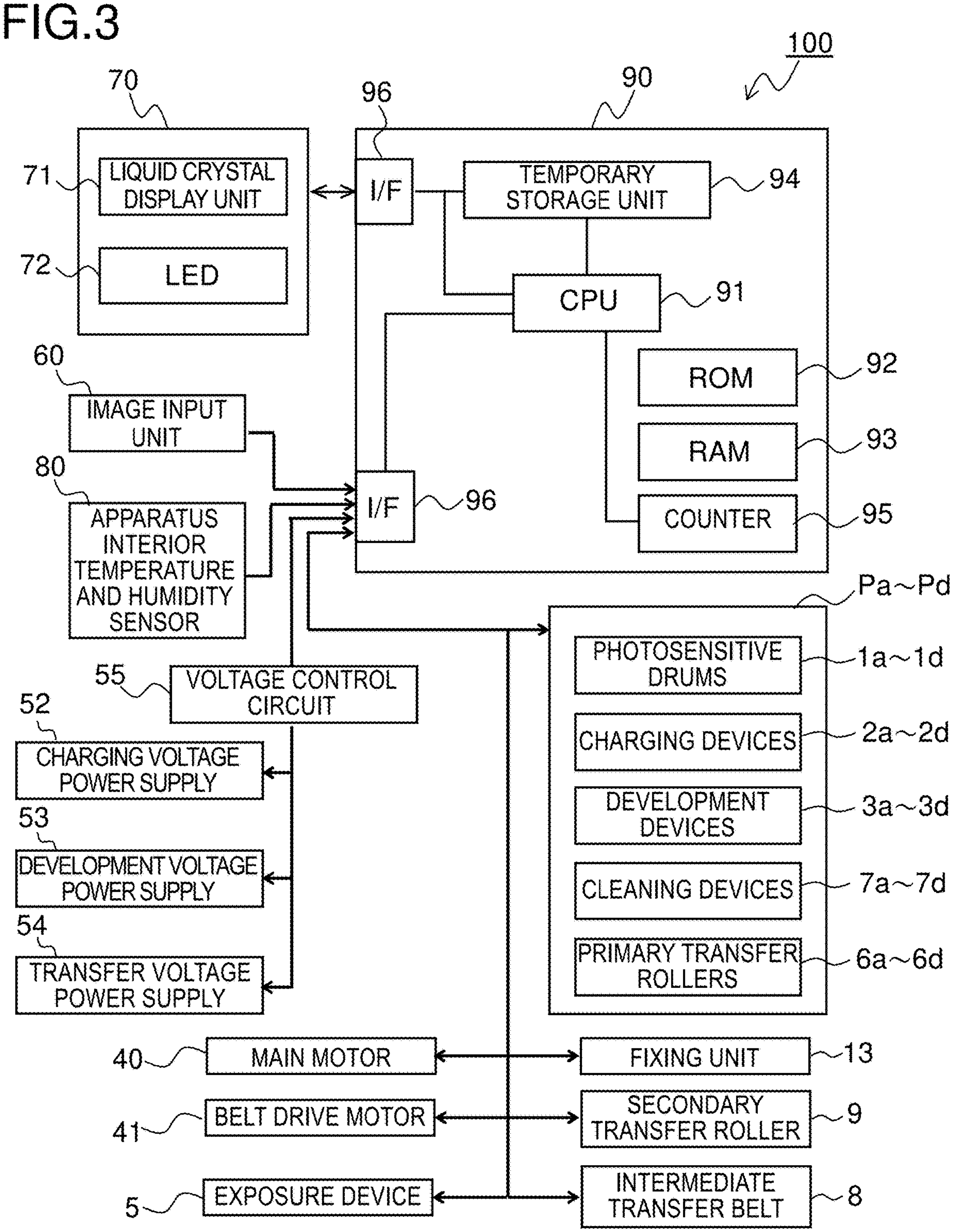
FIG. 3 is a block diagram showing an example of a control path used in the color printer.

FIG. 3 is a block diagram showing an example of a control path used in the color printer 100. Since various types of control are performed on the portions of the color printer 100 for use of the color printer 100, the control path of the entire color printer 100 is complicated. Hence, here, necessary parts of the control path for implementing the present disclosure will be mainly described.

A charging voltage power supply 52 applies the charging voltage to the charging rollers 21 in the charging devices 2*a* to 2*d*. A development voltage power supply 53 applies, to the development rollers 29 in the development devices 3*a* to 3*d*, the development voltage in which an alternating-current voltage Vac is superimposed on a direct-current voltage Vdc. A transfer voltage power supply 54 respectively applies, to the primary transfer rollers 6*a* to 6*d* and the secondary transfer roller 9, a primary transfer voltage and a secondary transfer voltage which are predetermined. A voltage control circuit 55 is connected to the charging voltage power supply 52, the development voltage power supply 53 and the transfer voltage power supply 54, and operates these power supplies by the output signals from the control unit 90.

An image input unit 60 is a reception unit which receives the image data transmitted from the personal computer or the like to the color printer 100. Image signals input from the image input unit 60 are converted to digital signals, and thereafter the digital signals are fed out to a temporary storage unit 94.

In an operation unit 70, a liquid crystal display unit 71 and an LED 72 are provided. The liquid crystal display unit 71 displays the state of the operation of the color printer 100, the status of image formation, the number of sheets printed and the like. The liquid crystal display unit 71 also has the function of a touch panel which is used when settings in a ghost-agglomerated white spots improvement mode and a fog improvement mode to be described later are changed. The LED 72 displays various types of states of the color printer 100, errors and the like. Various types of settings in the color printer 100 can also be made from a printer driver in the personal computer.

Furthermore, in the operation unit 70, a start button with which a user provides an instruction to start the image formation, a stop/clear button which is used, for example, to stop the image formation, a reset button which is used to bring various types of settings in the color printer 100 into a default state and the like are provided.

An apparatus interior temperature and humidity sensor 80 detects a temperature and a humidity inside the color printer 100, and in particular, a temperature and a humidity around the image formation units Pa to Pd, and is arranged in the vicinity of the image formation units Pa to Pd.

The control unit 90 includes at least: a CPU (Central Processing Unit) 91 which serves as an arithmetic processing unit; a ROM (Read Only Memory) 92 which is a read-only storage unit; a RAM (Random Access Memory) 93 which is a read/write storage unit; the temporary storage unit 94 which temporarily stores the image data and the like; a counter 95; and a plurality of (here, two) I/Fs (interface) 96 which transmit control signals to devices in the color printer 100 and receive input signals from the operation unit 70. The control unit 90 can be arranged in any place inside the main body of the color printer 100.

The ROM 92 stores data and the like, such as control programs for the color printer 100 and necessary values for control, which is not changed during use of the color printer 100. The RAM 93 stores necessary data generated during control of the color printer 100, data which is temporarily necessary for the control of the color printer 100 and the like. The RAM 93 (or the ROM 92) also stores, as described later, a relationship between the absolute humidity and the cumulative driving distance and the frequency when the frequency of the alternating-current voltage Vac of the development voltage applied to the development rollers 29 of the development devices 3*a* to 3*d* is changed based on the absolute humidity and the cumulative driving distance of the photosensitive drums 1*a* to 1*d*. The temporary storage unit 94 temporarily stores the image signals which are input from the image input unit 60 and are converted to the digital signals. The counter 95 cumulates and counts the number of sheets printed.

The control unit 90 transmits the control signals from the CPU 91 via the I/Fs 96 to the parts and devices of the color printer 100. The parts and devices transmit signals indicating the states thereof and input signals via the I/Fs 96 to the CPU 91. Examples of the parts and the devices controlled by the control unit 90 include the image formation units Pa to Pd, the exposure device 5, the intermediate transfer belt 8, the secondary transfer roller 9, the fixing unit 13, the voltage control circuit 55, the image input unit 60, the operation unit 70, the apparatus interior temperature and humidity sensor 80 and the like.

In the color printer 100, when the toner images are primarily transferred from the photosensitive drums 1*a* to 1*d* to the intermediate transfer belt 8, a primary transfer current flows from the primary transfer rollers 6*a* to 6*d* into the photosensitive drums 1*a* to 1*d*, and thus the surface potential of the photosensitive drums 1*a* to 1*d* is lowered. More specifically, the amount of primary transfer current flowing into a part (image region) where the toner is present is decreased, and the amount of primary transfer current flowing into a part (non-image region) where no toner is present is increased, with the result that the surface potential of the photosensitive drums 1*a* to 1*d* is changed depending on whether the toner is present. Consequently, there is a problem in which a drum ghost that causes inconsistencies in density occurs.

The occurrence of the drum ghost is closely related to the primary transfer current and the frequency of the alternating-current voltage Vac of the development voltage (hereinafter simply referred to as the development frequency). Specifically, as the primary transfer current is increased, a change in the surface potential of the photosensitive drums 1*a* to 1*d* is increased, and as the development frequency is increased, inconsistencies in the surface potential are easily caused, with the result that in both cases, the drum ghost easily occurs. Hence, even if one of the settings of the primary transfer current and the development frequency is changed, it is difficult to effectively suppress the drum ghost.

On the other hand, toner aggregates in the development devices 3*a* to 3*d* may be developed on the photosensitive drums 1*a* to 1*d*, and may be further primarily transferred on the intermediate transfer belt 8. Here, so-called agglomerated white spots are also disadvantageously generated in which the toner aggregates are interposed between the photosensitive drums 1*a* to 1*d* and the intermediate transfer belt 8 to generate gaps, and thus toners around the toner aggregates are not transferred to form white spots. The agglomerated white spots can be effectively suppressed by increasing the primary transfer current and the development frequency.

In other words, there is a trade-off relationship between the settings of the primary transfer current and the development frequency for suppressing the drum ghost and the settings of the primary transfer current and the development frequency for suppressing the agglomerated white spots. Hence, when the primary transfer current and the development frequency are changed so that the drum ghost is improved, the agglomerated white spots may be worsened.

Hence, in the color printer 100 according to the first embodiment of the present disclosure, the ghost-agglomerated white spots improvement mode (first image quality improvement mode) is provided in which the settings of the primary transfer current and the development frequency are changed at a time to improve the drum ghost and the agglomerated white spots. Examples of the settings of the development frequency and the primary transfer current in the ghost-agglomerated white spots improvement mode are shown in Tables 1 and 2. In the examples shown in Table 1, menu setting values 1 to 7 are provided in which the setting values of the development frequency and the primary transfer current are different, and the menu setting value 4 is a default (reference).

TABLE 1

| Menu setting value | 1 | 2 | 3 | 4 | 5 | 6 | 7 |
|---|---|---|---|---|---|---|---|
| Development frequency [Hz] | | | ※ | | 3500 | 3000 | 3000 |
| Primary transfer coefficient | ×1.3 | ×1.2 | ×1.1 | ×1.0 | ×0.9 | ×0.8 | ×0.7 |

TABLE 2

| Drum driving distance | | Less than 62500 m | 62500 m or more |
|---|---|---|---|
| Absolute humidity [g/m3] | Less than 4 | 4000 | 4000 |
| | 4 or more and less than 5 | 4200 | 4400 |
| | 5 or more and less than 6 | 4400 | 4800 |
| | 6 or more and less than 7 | 4600 | 5200 |
| | 7 or more and less than 8 | 4800 | 5600 |
| | 8 or more | 5000 | 6000 |

The development frequency is set to be lowered as the menu setting value is increased. More specifically, for the menu setting values 1 to 4, the development frequency is determined as shown in Table 2 based on the absolute humidity and the cumulative driving distance (drum driving distance) of the photosensitive drums 1*a* to 1*d*. For the menu setting values 5 to 7, the development frequency is fixed regardless of the absolute humidity and the drum driving distance.

When the absolute humidity is low, the surface potential of the photosensitive drums 1*a* to 1*d* is unstable, and thus the drum ghost easily occurs. When the drum driving distance is short, the thickness of the photosensitive layer 19*b* (see FIG. 2) of the photosensitive drums 1*a* to 1*d* is large, and thus the drum ghost is easily worsened. Hence, when the absolute humidity is low, if the development frequency is rapidly increased, the drum ghost remarkably occurs. Therefore, in Table 2, when the drum driving distance is short, the range of a change (range of an increase) in the development frequency relative to a change in the absolute humidity is decreased as compared with a case where the drum driving distance is long, and thus the occurrence of the drum ghost is suppressed.

Specifically, for example, the control unit 90 calculates the drum driving distance from the outside diameter of the photosensitive drums 1*a* to 1*d* and the cumulative number of revolutions thereof. The drum driving distance may be calculated from the rotational speed (linear speed) of the photosensitive drums 1*a* to 1*d* and a cumulative driving time. Then, based on the calculated drum driving distance and the absolute humidity detected by the apparatus interior temperature and humidity sensor 80, the development frequencies of the menu setting values 1 to 4 are determined.

In a case where the drum driving distance is less than 62500 m, when the absolute humidity is less than 4 [g/m$^3$], the development frequency is set to 4000 [Hz], and as the absolute humidity is increased by 1 [g/m$^3$], the frequency is increased by 200 [Hz]. Then, when the absolute humidity is equal to or greater than 8 [g/m$^3$], the development frequency is maintained at 5000 [Hz].

On the other hand, in a case where the drum driving distance is equal to or greater than 62500 m, when the absolute humidity is less than 4 [g/m$^3$], the development frequency is set to 4000 [Hz], and as the absolute humidity is increased by 1 [g/m$^3$], the frequency is increased by 400 [Hz]. Then, when the absolute humidity is equal to or greater than 8 [g/m$^3$], the development frequency is maintained at 6000 [Hz].

As described above, the range of a change in the development frequency is changed based on the drum driving distance, and thus it is possible to set an appropriate frequency corresponding to the deterioration state of the photosensitive drums 1*a* to 1*d*. Specifically, when the cumulative driving distance of the photosensitive drums 1*a* to 1*d* is equal to or greater than a predetermined distance, the drum ghost is unlikely to occur, and thus the range of a change in the development frequency relative to a change in the absolute humidity is increased. In this way, while development characteristics when the absolute humidity is low are being maintained, the occurrence of fog which will be described later can be suppressed.

The primary transfer current is determined by multiplying a reference current value (here, 9 [μA]) by a primary transfer coefficient set in each of the menu setting values 1 to 7. In the menu setting values 1 to 3, the primary transfer coefficient is greater than 1.0, and thus the primary transfer current is greater than the reference current value. In the menu setting values 5 to 7, the primary transfer coefficient is less than 1.0, and thus the primary transfer current is less than the reference current value.

The user uses the settings of the liquid crystal display unit 71 of the operation unit 70 to change the menu setting values in the ghost-agglomerated white spots improvement mode according to the status of the occurrence of the drum ghost and the agglomerated white spots in an image output by print processing, and thereby can change the primary transfer current and the development frequency at a time.

For example, when the drum ghost occurs, the menu setting value is changed from 4 to one of 5 to 7, and thus the development frequency and the primary transfer current are lowered, with the result that the occurrence of the drum ghost can be suppressed. When the agglomerated white spots are generated, the menu setting value is changed from 4 to one of 1 to 3, and thus the development frequency and the primary transfer current are increased, with the result that the generation of the agglomerated white spots can be suppressed.

The status of the occurrence of the drum ghost, the agglomerated white spots and image fog when the ghost-agglomerated white spots improvement mode is performed based on the settings shown in Table 1 is shown in Table 3. As a comparative example, the status of the occurrence of the drum ghost, the agglomerated white spots and the image fog when only the development frequency is fixed to 4000 [Hz] based on the settings in Table 1 is shown in Table 4. In Tables 3 and 4, a case where the image has no problem is indicated by "good", a case where an image failure occurs depending on error conditions of the absolute humidity, the drum driving distance and the like is indicated by "average" and a case where an image failure occurs is indicated by "poor".

TABLE 3

| Menu setting value | 1 | 2 | 3 | 4 | 5 | 6 | 7 |
|---|---|---|---|---|---|---|---|
| Ghost | Poor | Average | Average | Average | Good | Good | Good |
| Agglomerated white spots | Good | Good | Good | Average | Average | Average | Poor |
| Fog | Good | Good | Good | Average | Average | Average | Average |

TABLE 4

| Menu setting value | 1 | 2 | 3 | 4 | 5 | 6 | 7 |
|---|---|---|---|---|---|---|---|
| Ghost | Poor | Average | Average | Average | Average | Average | Average |
| Agglomerated white spots | Average | Average | Average | Average | Average | Average | Poor |
| Fog | Average | Average | Average | Average | Average | Average | Average |

It is confirmed that as shown in Table 3, when the development frequency is changed according to the menu setting values in Table 1, the menu setting value is changed to one of 5 to 7, and thus the occurrence of the drum ghost can be suppressed whereas the menu setting value is changed to one of 1 to 3, and thus the generation of the agglomerated white spots can be suppressed. By contrast, as shown in Table 4, when the development frequency is fixed to 4000 [Hz], it is impossible to sufficiently improve both the drum ghost and the agglomerated white spots.

It is confirmed from the results described above that when the menu setting values are changed in the ghost-agglomerated white spots improvement mode to simultaneously change the development frequency and the primary transfer current, as compared with a case where only the primary transfer current is changed, it is possible to effectively suppress the occurrence of the drum ghost and the agglomerated white spots.

Incidentally, when the development frequency is set to be low in order to suppress the drum ghost, the so-called image fog (hereinafter simply referred to as the fog) easily occurs in which the toner is adhered to a white part. Hence, in the present embodiment, the fog improvement mode (second image quality improvement mode) is provided in which the charging voltage applied to the charging devices 2*a* to 2*d* is increased to improve the fog. The fog improvement mode is performed as necessary after the ghost-agglomerated white spots improvement mode is performed.

Examples of the setting of the charging voltage in the fog improvement mode are shown in Table 5. In the examples shown in Table 5, menu setting values 1 to 7 are provided in which the setting values of the charging voltage are different, and the menu setting value 4 is a default (reference).

TABLE 5

| Menu setting value | 1 | 2 | 3 | 4 | 5 | 6 | 7 |
|---|---|---|---|---|---|---|---|
| Charging correction value [V] | −75 | −50 | −25 | 0 | +25 | +50 | +75 |

The charging voltage is determined by adding a charging correction value set in each of the menu setting values 1 to 7 to a reference voltage (here, 450 [V]). Since in the menu setting values 1 to 3, the charging correction value is negative, the charging voltage is lower than the reference voltage. Since in the menu setting values 5 to 7, the charging correction value is positive, the charging voltage is greater than the reference voltage.

The user uses the settings of the liquid crystal display unit 71 of the operation unit 70 to change the menu setting values in the fog improvement mode according to the status of the occurrence of the fog in an image output after the ghost-agglomerated white spots improvement mode is performed. For example, when the fog occurs, the menu setting value is changed from 4 to one of 5 to 7 to increase the charging voltage, and thus it is possible to suppress the occurrence of the fog.

Since in the menu setting values 1 to 3 in Table 5, the charging voltage is lower than the reference voltage, the menu setting values 1 to 3 are not used in the fog improvement mode. The menu setting values 1 to 3 are used when the surface potential of the photosensitive drums 1*a* to 1*d* is adjusted.

Figure 4:
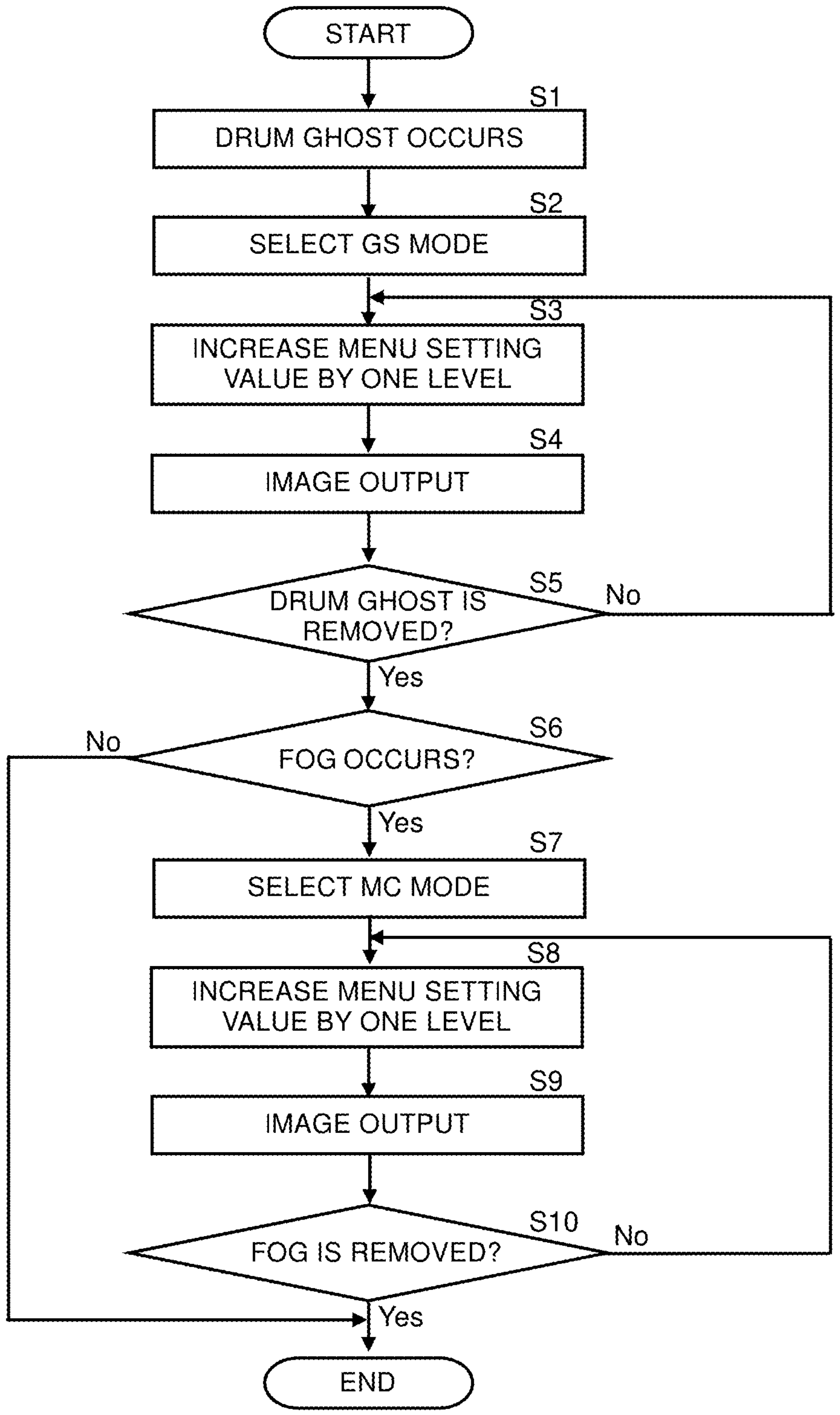
FIG. 4 is a flowchart showing an example of control when a drum ghost is removed in a GS mode in the color printer in the first embodiment of the present disclosure.

FIG. 4 is a flowchart showing an example of control when in the color printer 100 of the first embodiment, the drum ghost is removed in the ghost-agglomerated white spots improvement mode (GS mode). With reference to FIGS. 1 to 3 and FIGS. 5 to 7 to be described later as necessary, along the steps of FIG. 4, a procedure for removing the drum ghost in the "ghost-agglomerated white spots improvement mode" will be described.

When the user visually checks an image which is output to confirm the occurrence of the drum ghost (step S1), the user selects the ghost-agglomerated white spots improvement mode (GS mode) from the liquid crystal display unit 71 (step S2). Then, the user increases the menu setting value in the GS mode by one level (step S3).

Figure 5:
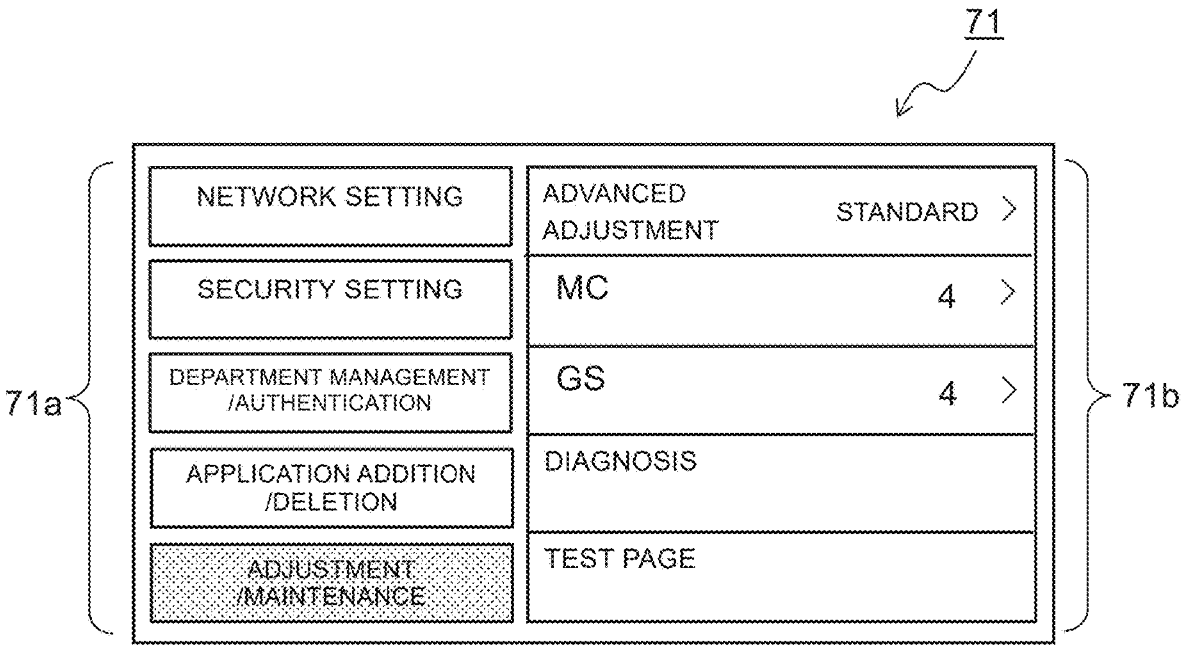
FIG. 5 is a plan view of the liquid crystal display unit of the color printer in the first embodiment and is a diagram showing a state where the GS mode is selected.

FIG. 5 is a plan view of the liquid crystal display unit 71 and is a diagram showing a state where the GS mode is selected. As shown in FIG. 5, a plurality of mode setting keys 71*a* are displayed on the left side of the screen of the liquid crystal display unit 71. When an "adjustment/maintenance key" (which is hatched in FIG. 5) among the mode setting keys 71*a* is down, on the right side of the screen, function keys 71*b* related to the "adjustment/maintenance" are displayed. In a "GS key" for selecting the GS mode among the function keys 71*b*, the current menu setting value "4" is displayed.

Figure 6:
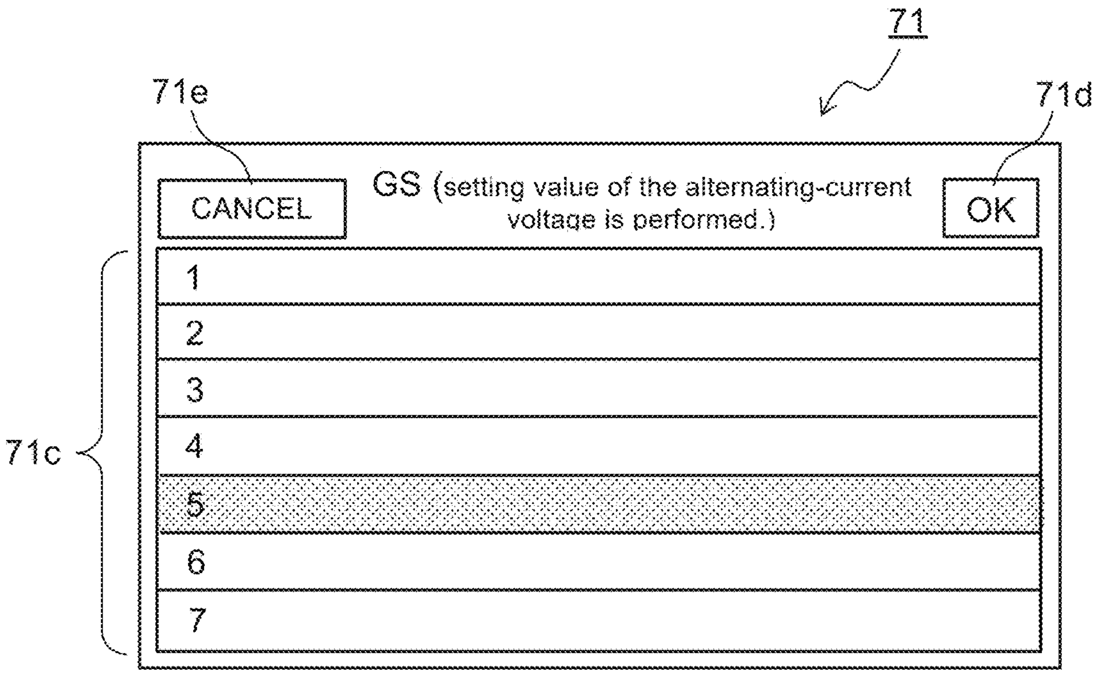
FIG. 6 is a plan view of the liquid crystal display unit of the color printer in the first embodiment and is a diagram showing a state where menu setting values in the GS mode are displayed.

FIG. 6 is a diagram showing a state where menu setting values in the GS mode are displayed. When in the state of FIG. 5, the "GS key" among the function keys 71*b* is pressed down, as shown in FIG. 6, on the liquid crystal display unit 71, menu setting value selection keys 71*c* from "1" to "7" are displayed. On the upper right of the screen of the liquid crystal display unit 71, a determination key 71*d* for determining a change on the selected menu setting value is displayed. On the upper left of the screen of the liquid crystal display unit 71, a cancellation key 71*e* for deleting the display of the menu setting value and returning to the previous screen (the state of FIG. 5) is displayed.

The user presses down, among the menu setting value selection keys 71*c*, the menu setting value "5" (which is hatched in FIG. 6) which is one level higher than the current menu setting value "4", and then presses down the determination key 71*d*. In this way, the menu setting value in the GS mode is changed from "4" to "5".

Then, the user performs image output at the changed menu setting value "5" (step S4). Then, whether the drum ghost is removed in an output image is determined (step S5). When the drum ghost is not removed (no in step S5), the processing returns to step S3, the menu setting value in the GS mode is further increased by one level, and then the image output is performed (steps S3 and S4).

When the drum ghost is removed (yes in step S5), the user determines whether the fog occurs in the output image (step S6). When the fog occurs (yes in step S6), the user selects the fog improvement mode (MC mode) from the liquid crystal display unit 71 (step S7). Then, the menu setting value in the MC mode is increased by one level (step S8).

Figure 7:
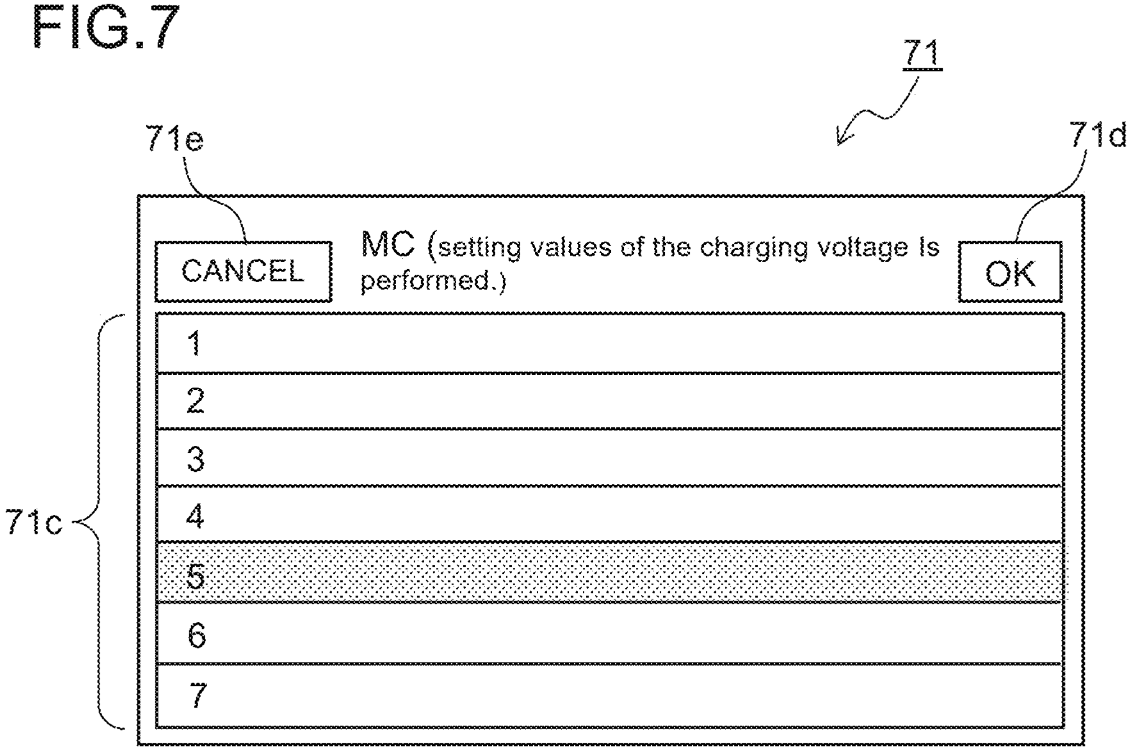
FIG. 7 is a plan view of the liquid crystal display unit of the color printer in the first embodiment and is a diagram showing a state where menu setting values in a MC mode are displayed.

FIG. 7 is a diagram showing a state where the menu setting values in the MC mode are displayed. When in the state of FIG. 5, a "MC key" among the function keys 71*b* is pressed down, as shown in FIG. 7, on the liquid crystal display unit 71, menu setting value selection keys 71*c* from "1" to "7" are displayed. On the upper right of the screen of the liquid crystal display unit 71, the determination key 71*d* for determining a change on the selected menu setting value is displayed. On the upper left of the screen of the liquid crystal display unit 71, the cancellation key 71*e* for deleting the display of the menu setting value and returning to the previous screen (the state of FIG. 5) is displayed.

The user presses down, among the menu setting value selection keys 71*c*, the menu setting value "5" (which is hatched in FIG. 7) which is one level higher than the current menu setting value "4", and then presses down the determination key 71*d*. In this way, the menu setting value in the MC mode is changed from "4" to "5".

Then, the user performs the image output at the changed menu setting value "5" (step S9). Then, whether the fog is removed in the output image is determined (step S10). When the fog is not removed (no in step S10), the processing returns to step S8, the menu setting value in the MC mode is further increased by one level, and then the image output is performed (steps S8 and S9).

When the fog is removed (yes in step S10), the user completes the processing without performing a further step. When the fog does not occur in step S6 (no in step S6), the user completes the processing without performing the MC mode.

Figure 8:
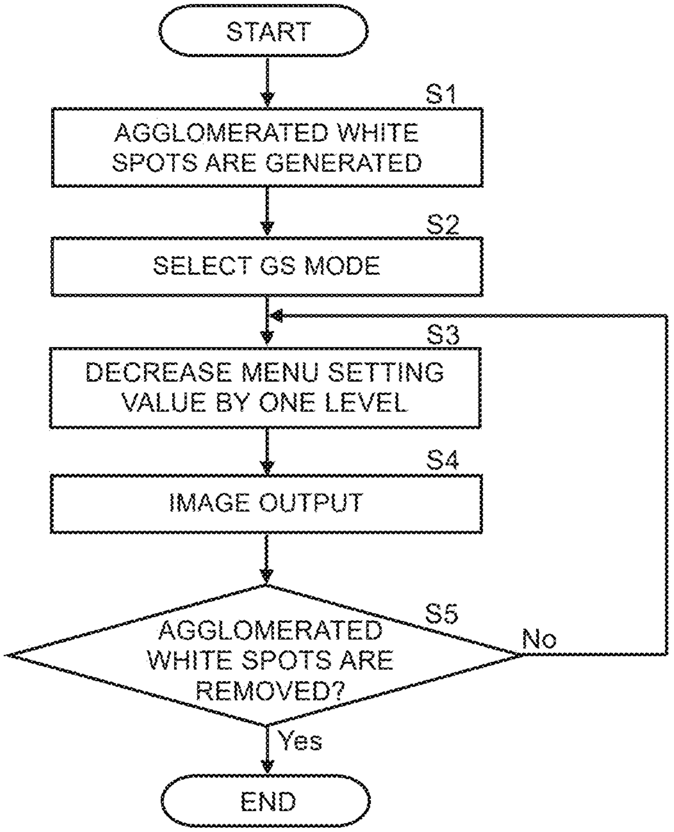
FIG. 8 is a flowchart showing an example of control when agglomerated white spots are removed in the GS mode in the color printer of the first embodiment.

FIG. 8 is a flowchart showing an example of control when in the color printer 100 of the first embodiment, the agglomerated white spots are removed in the ghost-agglomerated white spots improvement mode (GS mode). With reference to FIGS. 1 to 3 and FIGS. 5 and 6 as necessary, along the steps of FIG. 8, a procedure for removing the agglomerated white spots in the "ghost-agglomerated white spots improvement mode" will be described.

When the user visually checks an image which is output to confirm the generation of the agglomerated white spots (step S1), the user selects the ghost-agglomerated white spots improvement mode (GS mode) from the liquid crystal display unit 71 (step S2). Then, the user decreases the menu setting value in the GS mode by one level (step S3). For example, when the menu setting value is the default of "4", the menu setting value is changed from "4" to "3". A procedure for changing the menu setting values is the same as that shown in FIGS. 5 and 6.

Then, the user performs the image output at the changed menu setting value "3" (step S4). Then, whether the agglomerated white spots are removed in the output image is determined (step S5). When the agglomerated white spots are not removed (no in step S5), the processing returns to step S3, the menu setting value in the GS mode is further decreased by one level, and then the image output is performed (steps S3 and S4). When the agglomerated white spots are removed (yes in step S5), the user completes the processing without performing a further step.

When the agglomerated white spots are removed, the settings are changed such that the development frequency is increased (the menu setting value is lowered), and thus the fog is unlikely to occur after the change. Hence, in the example of control shown in FIG. 8, the MC mode (steps S6 to S10 in FIG. 4) is not performed but as in FIG. 4, after the removal of the agglomerated white spots, the occurrence of the fog may be checked, and when the fog is confirmed, the MC mode may be performed.

previously combined, and the settings of the primary transfer current, the development frequency and the charging voltage are simultaneously changed. Examples of the settings of the development frequency, the primary transfer current and the charging voltage in the ghost-agglomerated white spots-fog improvement mode are shown in Table 6.

TABLE 6

| Menu setting value | 1 | 2 | 3 | 4 | 5 | 6 | 7 |
|---|---|---|---|---|---|---|---|
| Development frequency [Hz] | | | ※ | | 3500 | 3000 | 3000 |
| Primary transfer coefficient | ×1.3 | ×1.2 | ×1.1 | ×1.0 | ×0.9 | ×0.8 | ×0.7 |
| Charging correction value [V] | 0 | 0 | 0 | 0 | +25 | +50 | +75 |

In the example of control shown in FIGS. 4 and 8, the ghost-agglomerated white spots improvement mode (GS mode) is provided in which the settings of the primary transfer current and the development frequency are simultaneously changed, and thus as compared with a conventional method for separately changing the settings of the primary transfer current and the development frequency, it is possible to reliably improve the drum ghost and the agglomerated white spots. A sufficient OW (operation window) when the drum ghost and the agglomerated white spots which can be improved by changing the settings of the primary transfer current and the development frequency are simultaneously improved can also be secured. Hence, it is possible to effectively improve both the drum ghost and the agglomerated white spots.

The control unit 90 determines the development frequency based on the absolute humidity and the drum driving distance to be able to set appropriate conditions corresponding to errors in the absolute humidity and the drum driving distance. In this way, even when environmental fluctuations and durability errors are large, it is possible to enhance the effects of improving the drum ghost and the agglomerated white spots and to secure a sufficient OW.

When the fog occurs after the ghost-agglomerated white spots improvement mode (GS mode) is performed to improve the drum ghost, the fog improvement mode (MC mode) is performed. In this way, it is possible to simultaneously improve the fog which easily occurs as a side effect when the development frequency is lowered.

Furthermore, the GS mode and the MC mode can be set from the liquid crystal display unit 71, and thus the user can change the settings of the development frequency, the primary transfer current and the charging voltage at a time, with the result that it is possible to improve the drum ghost and the agglomerated white spots with a simple method.

Another example of control which uses the ghost-agglomerated white spots improvement mode in the color printer 100 of the first embodiment will then be described. In the example of control shown in FIG. 4, after the primary transfer current and the development frequency are changed in the ghost-agglomerated white spots improvement mode (GS mode), when the fog occurs in the output image, the mode is changed to the fog improvement mode (MC mode), and thus the charging voltage is changed. However, in the present example of control, a ghost-agglomerated white spots-fog improvement mode is provided in which the ghost-agglomerated white spots improvement mode (GS mode) and the fog improvement mode (MC mode) are In the example shown in Table 6, menu setting values 1 to 7 are provided in which the setting values of the development frequency, the primary transfer current and the charging voltage are different, and the menu setting value 4 is a default (reference). The setting values of the development frequency, the primary transfer current and the charging voltage are provided by combining the setting values in Tables 1 and 5 described above. However, since the menu setting values 1 to 3 for lowering the charging voltage below the reference voltage are not used in Table 5, in Table 6, the charging correction values of the menu setting values 1 to 3 are 0 [V].

The ghost-agglomerated white spots-fog improvement mode is provided in which the three settings of the primary transfer current, the development frequency and the charging voltage can be simultaneously changed, and thus in condition settings (menu setting values 5 to 7) in which the development frequency is low and thus the fog easily occurs, the charging voltage is previously increased, with the result that the occurrence of the fog can be prevented. Hence, an operation for outputting an image and checking the occurrence of the fog after the settings of the primary transfer current and the development frequency are changed can be omitted, and thus it is possible to further enhance the convenience of the user.

A color printer 100 according to the second embodiment of the present disclosure will then be described. In the first embodiment described above, when the user does not output an image, it is not clear whether the drum ghost (historical development) occurs. Disadvantageously, even when the drum ghost occurs, if the user does not recognize the occurrence of the drum ghost, it is likely that the user does not perform the ghost-agglomerated white spots improvement mode (GS mode) by operating the liquid crystal display unit 71.

Hence, in the color printer 100 of the second embodiment, a ghost detection mode is performed in which whether the drum ghost occurs is detected on the intermediate transfer belt 8 without the user outputting an image. Then, when the occurrence of the drum ghost is detected, the ghost-agglomerated white spots improvement mode (GS mode) is automatically performed.

When a solid image is primarily transferred from the photosensitive drums 1*a* to 1*d* on the intermediate transfer belt 8, a reduction in the surface potential of the photosensitive drums 1*a* to 1*d* caused by flowing in of the primary transfer current is decreased only in the region of formation of the solid image as compared with the other parts. Consequently, after one revolution of the photosensitive drums 1*a* to 1*d*, the surface potential of a part which is the range of formation of the solid image is increased, and thus a potential difference (development potential difference) between the part which is the range of formation of the solid image and the development roller 29 is decreased.

Hence, when a half image is formed in a region including the part which is the range of formation of the solid image, the drum ghost occurs in which the image density of only the part which is the range of formation of the solid image is lowered. In the ghost detection mode, a density difference between the part which is the range of formation of the solid image, and a part therearound is measured, and thus whether the drum ghost occurs is detected.

Figure 9:
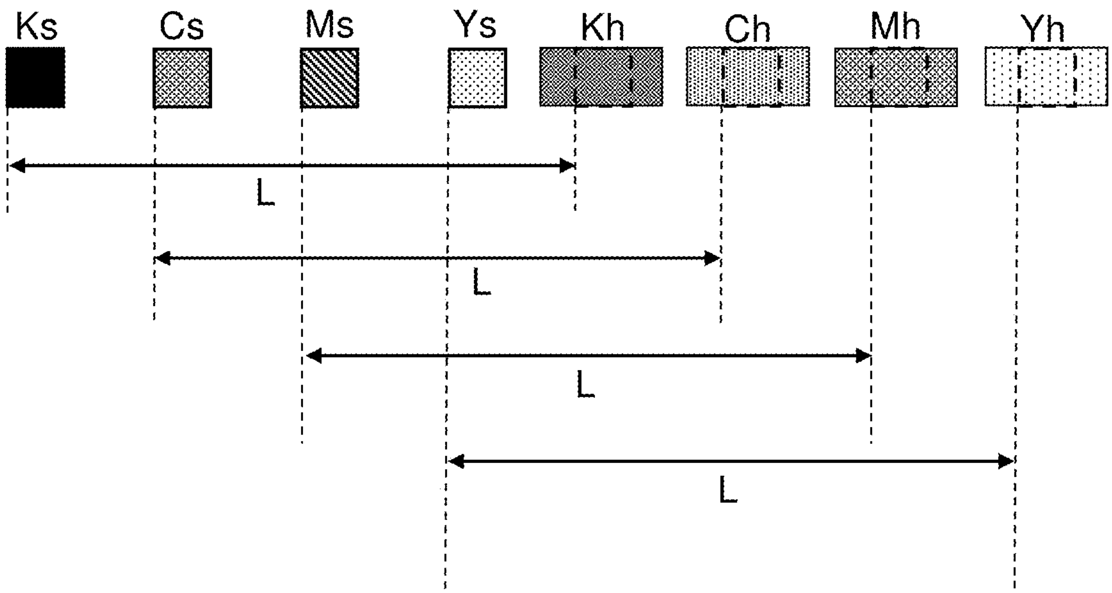
FIG. 9 is a diagram showing an example of a detection image used in a ghost detection mode which is performed in a color printer in the second embodiment of the present disclosure.

FIG. 9 is a diagram showing an example of a detection image used in the ghost detection mode which is performed in the color printer 100 of the second embodiment. As shown in FIG. 9, the detection image is formed with half images Yh to Kh of the individual colors. More specifically, the half images Yh to Kh are formed after one revolution of the photosensitive drums 1*a* to 1*d* (after the movement of only a drum circumferential length L) from the formation of the solid images Ys to Ks on the intermediate transfer belt 8.

The half images Yh to Kh include parts (indicated by dashed lines in FIG. 9) which are the ranges of formation of the solid images Ys to Ks after one revolution of the photosensitive drums 1*a* to 1*d*, and are formed to extend to the upstream side and the downstream side (the left/right direction in FIG. 9) in the conveyance direction of the intermediate transfer belt 8. Then, the image density sensor 27 is used to measure the densities of the half images Yh to Kh over the entire region in the conveyance direction. In this way, a density difference ΔID between the parts which are the ranges of formation of the solid images Ys to Ks and parts on the upstream and downstream sides thereof.

The half images Yh to Kh preferably include the parts which are the ranges of formation of the solid images Ys to Ks after one revolution of the photosensitive drums 1*a* to 1*d*. For example, the half images Yh to Kh may be formed to extend in the width direction of the intermediate transfer belt 8 (the up/down direction in FIG. 9). However, when the half images Yh to Kh are formed to extend in the width direction, a mechanism for moving the image density sensor 27 in the width direction is needed. As in the present embodiment, the half images Yh to Kh are formed to extend to the upstream and downstream sides in the conveyance direction of the intermediate transfer belt 8, and thus it is possible to detect the densities of the entire half images Yh to Kh without moving the image density sensor 27.

Figure 10:
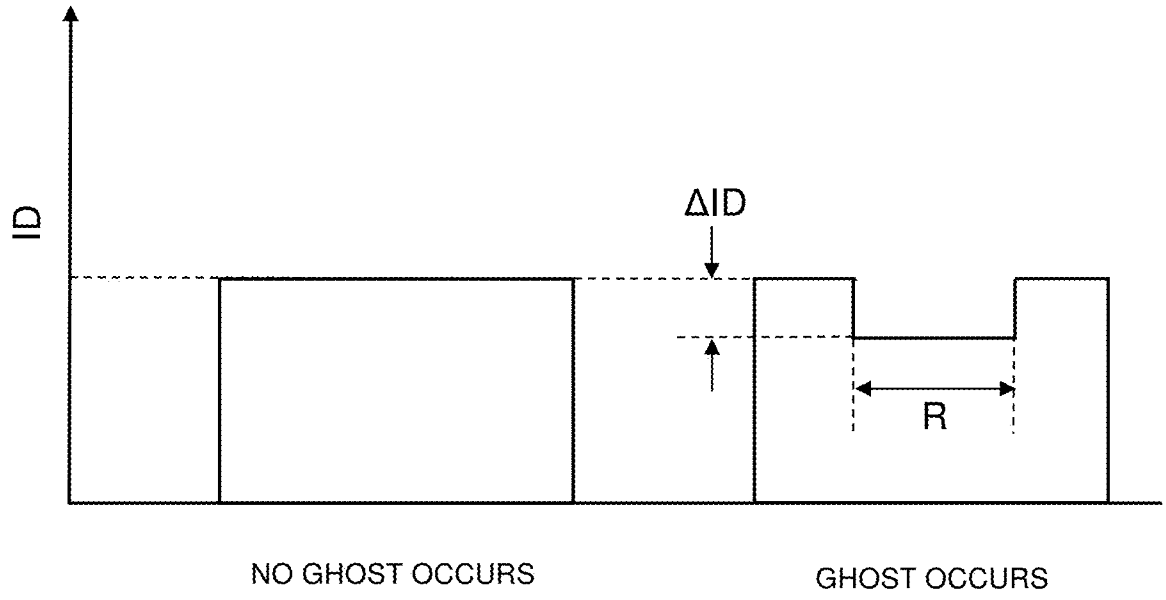
FIG. 10 is a graph showing the result of detection of half images in a case where no drum ghost occurs and in a case where a drum ghost occurs in the ghost detection mode.

FIG. 10 is a graph showing the result of detection of the half images in a case where no drum ghost occurs and in a case where the drum ghost occurs in the ghost detection mode. As shown in FIG. 10, in the case where no drum ghost occurs (the left side of FIG. 10), the density difference ΔID with the parts which are the ranges of formation of the solid images is low or zero. On the other hand, in the case where the drum ghost occurs (the right side of FIG. 10), the density difference ΔID is increased.

Hence, when the drum ghost is remarkable (the density difference ΔID is equal to or greater than a predetermined value), the ghost-agglomerated white spots improvement mode is performed in which the development frequency and the primary transfer current are changed, and thus the drum ghost is reduced. Examples of the settings of the development frequency and the primary transfer current in the ghost-agglomerated white spots improvement mode are shown in Table 7.

TABLE 7

| Density difference Δ ID | | ≤0.05 | ≤0.1 | ≤0.15 | ≤0.2 | 0.2< |
|---|---|---|---|---|---|---|
| Development frequency [kHz] | | 5.0 | 4.5 | 4.0 | 3.5 | 3.0 |
| Primary transfer current | Ratio | ×1.2 | ×1.1 | ×1.0 | ×0.9 | ×0.8 |
| | Current value [μA] | 10.8 | 9.9 | 9.0 | 8.1 | 7.2 |

As described previously, as the primary transfer current is increased, a change in the surface potential of the photosensitive drums 1*a* to 1*d* is increased, and as the development frequency is increased, inconsistencies in the surface potential are easily caused, with the result that in both cases, the drum ghost easily occurs. Hence, as shown in Table 7, the development frequency and the primary transfer current are decreased as the density difference ΔID is increased, and thus it is possible to improve the drum ghost.

Figure 11:
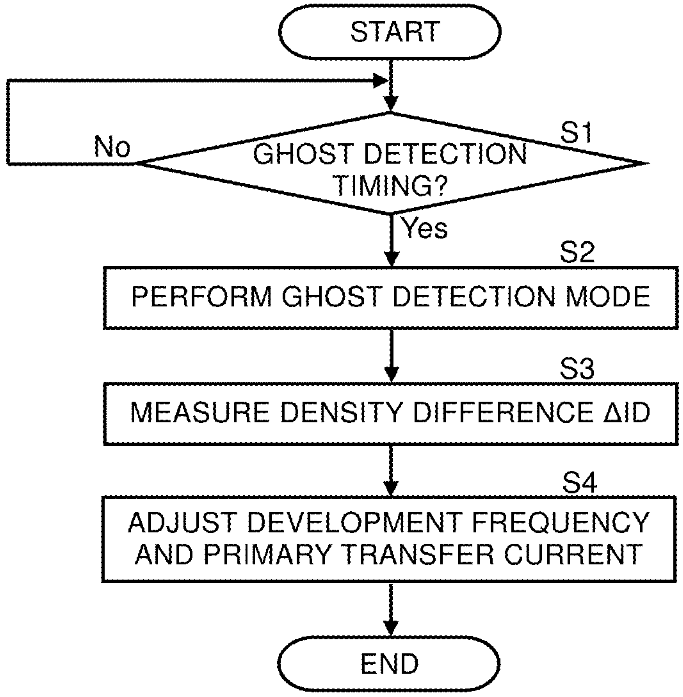
FIG. 11 is a flowchart showing an example of control when the ghost detection mode is performed to automatically remove the drum ghost in the color printer of the second embodiment.

FIG. 11 is a flowchart showing an example of control when the ghost detection mode is performed to automatically remove the drum ghost in the color printer 100 of the second embodiment. With reference to drawings 1 to 10 as necessary, along the steps of FIG. 11, a procedure for performing the ghost detection mode to automatically remove the drum ghost will be described.

The control unit 90 first determines whether it is the timing at which the drum ghost is detected (step S1). Examples of the timing at which the drum ghost is detected include a time when a predetermined number of sheets (for example, 250 sheets) have been printed after the previous ghost detection mode was performed, a time when the power of the color printer 100 is turned on and the like.

When it is the timing at which the drum ghost is detected (yes in step S1), the ghost detection mode is performed (step S2). Specifically, the solid images Ys to Ks and the half images Yh to Kh as shown in FIG. 9 are formed on the intermediate transfer belt 8. Then, the image density sensor 27 (see FIG. 1) is used to detect the densities of the half images Yh to Kh.

Then, the control unit 90 measures, based on the result of the detection performed by the image density sensor 27, the density difference ΔID between the parts which are the ranges of formation of the solid images Ys to Ks and the parts on the upstream and downstream sides thereof in the half images Yh to Kh (step S3).

The control unit 90 adjusts the development frequency and the primary transfer current based on the density difference ΔID (step S4). Specifically, a relationship between the density difference ΔID, the development frequency and the primary transfer current as shown in Table 7 is used to set the development frequency and the primary transfer current.

In the example of control shown in FIG. 11, the ghost detection mode is performed, and thus the primary transfer current and the development frequency are determined based on the measured density difference ΔID in the half images Yh to Kh. Hence, even when the user does not output an image or even when the user does not recognize the occurrence of the drum ghost, the occurrence of the drum ghost can be detected, and when the drum ghost occurs, the development frequency and the primary transfer current for preventing the occurrence of the drum ghost are automatically set.

In this way, the drum ghost can be automatically improved without the liquid crystal display unit 71 being operated, and thus the convenience of the user can be further enhanced. When the fog occurs after the drum ghost is improved, as in the first embodiment, the liquid crystal display unit 71 is operated to perform the fog improvement mode (MC mode). When the agglomerated white spots are generated, the liquid crystal display unit 71 is operated to perform the ghost-agglomerated white spots improvement mode (GS mode).

The present disclosure is not limited to the embodiments described above, and various changes can be made without departing from the spirit of the present disclosure. For example, although in each of the above embodiments, the development devices 3*a* to 3*d* including the development rollers 29 which carry the two-component developers as shown in FIG. 2 are described, the present disclosure is not limited to this configuration, and can be applied to image forming apparatuses which include various development devices using two-component developers, such as a development device including a toner supply roller for supplying only the toner in the two-component developer to the development roller 29.

Although in each of the above embodiments, the image forming apparatus is described using the color printer 100 of a tandem type as the example, the present disclosure can naturally be applied to other image forming apparatuses of an intermediate transfer system such as a color copying machine and a color multifunctional peripheral.

The present disclosure can be utilized for image forming apparatuses of the intermediate transfer system. By the utilization of the present disclosure, image forming apparatuses can be provided in which the drum ghost that occurs due to combinations of various conditions can be reliably improved and setting margins for improving both the drum ghost and the agglomerated white spots can be secured.

What is claimed is:

1. An image forming apparatus comprising:

an image carrying member in which a photosensitive layer is formed on a surface;

a charging device that charges the surface of the image carrying member;

an exposure device that exposes the surface of the image carrying member charged by the charging device to form an electrostatic latent image in which charging is attenuated;

a development device that includes a developer carrying member which carries a developer containing a toner, and supplies, to the image carrying member, the toner contained in the developer carried by the developer carrying member to develop the electrostatic latent image into a toner image;

an intermediate transfer member on which the toner image formed on the image carrying member is sequentially primarily transferred;

a primary transfer member that is pressed against the image carrying member through the intermediate transfer member;

a secondary transfer member that secondarily transfers, on a recording medium, the toner image primarily transferred on the intermediate transfer member;

a charging voltage power supply that applies a charging voltage to the charging device;

a development voltage power supply that applies to the developer carrying member a development voltage in which an alternating-current voltage is superimposed on a direct-current voltage;

a transfer voltage power supply that applies, to the primary transfer member and the secondary transfer member, a transfer voltage of a polarity opposite to the toner image; and a control unit that controls the charging voltage power supply, the development voltage power supply and the transfer voltage power supply; and an input unit that selects and sets, through operation by a user, one of a plurality of modes including the first image quality improvement mode in which a frequency of the alternating-current voltage of the development voltage and a primary transfer current flowing between the image carrying member and the primary transfer member are simultaneously changed, wherein the control unit performs the first image quality improvement mode when the first image quality improvement mode is set through operation of the input unit by the user, the user can, through operation of the input unit, select and input one of a plurality of differently set setting values of the frequency of the alternating-current voltage and the primary transfer current, and the control unit simultaneously changes the frequency of the alternating-current voltage and the primary transfer current based on the setting value input from the input unit by the user.

2. The image forming apparatus according to claim 1, further comprising:

a humidity detection device that detects an absolute humidity around the development device, wherein the setting value is set such that the frequency of the alternating-current voltage is increased stepwise as the absolute humidity is increased.

3. The image forming apparatus according to claim 2, wherein the setting value is set such that a range of change of the frequency of the alternating-current voltage is smaller when a cumulative driving distance of the image carrying member is less than a predetermined distance than when the cumulative driving distance is equal to or greater than the predetermined distance.

4. An image forming apparatus comprising:

an image carrying member in which a photosensitive layer is formed on a surface;

a charging device that charges the surface of the image carrying member;

an exposure device that exposes the surface of the image carrying member charged by the charging device to form an electrostatic latent image in which charging is attenuated;

a development device that includes a developer carrying member which carries a developer containing a toner, and supplies, to the image carrying member, the toner contained in the developer carried by the developer carrying member to develop the electrostatic latent image into a toner image;

an intermediate transfer member on which the toner image formed on the image carrying member is sequentially primarily transferred;

a primary transfer member that is pressed against the image carrying member through the intermediate transfer member;

a secondary transfer member that secondarily transfers, on a recording medium, the toner image primarily transferred on the intermediate transfer member;

a charging voltage power supply that applies a charging voltage to the charging device;

a development voltage power supply that applies, to the developer carrying member, a development voltage in which an alternating-current voltage is superimposed on a direct-current voltage;

a transfer voltage power supply that applies, to the primary transfer member and the secondary transfer member, a transfer voltage of a polarity opposite to the toner image; and a control unit that controls the charging voltage power supply, the development voltage power supply and the transfer voltage power supply; and an input unit that selects and sets, through operation by a user, one of a plurality of modes including the first image quality improvement mode in which a frequency of the alternating-current voltage of the development voltage and a primary transfer current flowing between the image carrying member and the primary transfer member are simultaneously changed, wherein the control unit performs the first image quality improvement mode when the first image quality improvement mode is set through operation of the input unit by the user, after the first image quality improvement mode was performed, the user can, through operation of the input unit, select and set a second image quality improvement mode in which the charging voltage is changed, and when the second image quality improvement mode is set through operation of the input unit by the user, the control unit performs the second image quality improvement mode after the first image quality improvement mode was performed.

5. The image forming apparatus according to claim 4, wherein, in the second image quality improvement mode, the user can select and input one of a plurality of differently set setting values of the charging voltage through operation of the input unit, and the control unit changes the charging voltage based on the setting values input from the input unit by the user.

6. An image forming apparatus comprising:

an image carrying member in which a photosensitive layer is formed on a surface;

a charging device that charges the surface of the image carrying member;

an exposure device that exposes the surface of the image carrying member charged by the charging device to form an electrostatic latent image in which charging is attenuated;

a development device that includes a developer carrying member which carries a developer containing a toner and supplies, to the image carrying member, the toner contained in the developer carried by the developer carrying member to develop the electrostatic latent image into a toner image;

an intermediate transfer member on which the toner image formed on the image carrying member is sequentially primarily transferred;

a primary transfer member that is pressed against the image carrying member through the intermediate transfer member;

a secondary transfer member that secondarily transfers, on a recording medium, the toner image primarily transferred on the intermediate transfer member;

a charging voltage power supply that applies a charging voltage to the charging device;

a development voltage power supply that applies to the developer carrying member a development voltage in which an alternating-current voltage is superimposed on a direct-current voltage;

a transfer voltage power supply that applies, to the primary transfer member and the secondary transfer member, a transfer voltage of a polarity opposite to the toner image; and a control unit that controls the charging voltage power supply, the development voltage power supply and the transfer voltage power supply, an image density detection unit that detects a density of the toner image formed on the intermediate transfer member, wherein the control unit can perform a ghost detection mode in which the image density detection unit detects a density of a detection image formed on the intermediate transfer member to detect whether a drum ghost occurs, and based on a result of the ghost detection mode, the control unit performs a first image quality improvement mode in which a frequency of the alternating-current voltage of the development voltage and a primary transfer current flowing between the image carrying member and the primary transfer member are simultaneously changed, the detection image is a half image that is formed after one revolution of the image carrying member from formation of a solid image and includes a part which is a range of formation of the solid image, and the control unit determines the frequency of the alternating-current voltage and the primary transfer current based on a density difference ΔID between the part which is the range of formation of the solid image in the half image and a part therearound.

* * * * *